Patented May 19, 1953

2,639,291

UNITED STATES PATENT OFFICE 2,639,291

PROCESS FOR MAKING THIOCYANOGEN DERIVATIVES

Harry F. Pfann, Pittsburgh, Pa., assignor to Koppers Company, Inc., Pittsburgh, Pa., a corporation of Delaware No Drawing. Original application April 13, 1948, Serial No. 20,840. Divided and this application May 6, 1952, Serial No. 286,300

18 Claims. (Cl. 260—454)

This invention relates to the manufacture of free thiocyanogen $(SCN)_2$ and derivatives prepared by the reaction of thiocyanogen with organic compounds.

Heretofore thiocyanogen has been commonly made by treating either a metal thiocyanate with elemental bromine, or by reacting a metal thiocyanate in solution with copper sulfate to form cupric thiocyanate which in turn is decomposed to produce free thiocyanogen. While both of these processes are workable and yield free thiocyanogen, they are subject to certain limitations. The reaction of elemental bromine with thiocyanates is a costly process because of the expensive bromine which is required. The reaction of thiocyanates with copper sulfate yields large quantities of the voluminous, insoluble precipitate of cuprous thiocyanate from which separation of the other desired reaction products is somewhat difficult. Because of these and other considerations, it is highly desirable to provide a more workable and less expensive procedure for the preparation of free thiocyanogen.

The primary object of the present invention is to provide a process for the production of free thiocyanogen from inexpensive raw materials and with the production of a minimum of difficultly handled co-products.

Another object of this invention is to provide a process for the production of free thiocyanogen in such a medium that is may be readily reacted with organic compounds to make thiocyanogen derivatives.

A further object of the invention is to provide a cyclic process for the production of free thiocyanogen in which process no co-products or by-products are formed which are not easily removed from the reaction medium in a simple cyclic system.

I have now discovered that thiocyanogen may be produced by using hydrogen peroxide as an oxidizing agent to react upon thiocyanic acid or upon solutions of thiocyanates in acid medium. The reaction is presumed to proceed according to the following equation:

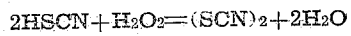

$$2HSCN + H_2O_2 = (SCN)_2 + 2H_2O$$

Accordingly, thiocyanic acid dissolved in a suitable reaction medium such as ethyl alcohol may be treated with hydrogen peroxide to form free thiocyanogen and water. The reaction medium should be acidic.

Alternatively, a solution of a metal thiocyanate dissolved in a solvent, may be made acid with a strong acid such as sulfuric or phosphoric acid, and thereupon treated with hydrogen peroxide as in the foregoing procedure.

In either of the above processes, the organic compound to be reacted with the free thiocyanogen may be added prior to the introduction of the hydrogen peroxide or, the solution of free thiocyanogen in the solvent may be added to the organic compound which is to be thiocyanated. For most commercial processes, it is preferred to prepare the solution of alkali thiocyanate and reactant organic compound in the solvent, and then add at a controlled rate the hydrogen peroxide which is to effect the liberation of the free thiocyanogen. The rate of oxidation of the thiocyanic acid by the hydrogen peroxide should be such as to permit simultaneous reaction of the free thiocyanogen without the accumulation of appreciable quantities of it. Such control of the reaction will lead to the formation of thiocyano derivatives with a minimum of undesirable by-products such as perthiocyanic acid and related compounds.

As a reaction medium there may be used any non-reactive liquid which is both a solvent for the thiocyanic acid, or for the alkali thiocyanate if it is used, and also a solvent for hydrogen peroxide and the organic compound to be reacted upon. Examples of solvents which are suitable include methyl alcohol, ethyl alcohol, isopropyl alcohol, and tert.-butyl alcohol. Acetic acid may also be used, as may the lower fatty acid esters such as ethyl acetate. Ether derivatives such as dioxane and the methyl ether of ethylene glycol or the ethyl ether of diethylene glycol are likewise suitable.

As an oxidizing agent, it is desirable to use hydrogen peroxide of between 30 and 90% purity in order to minimize the quantities handled and to minimize dilution of the reaction medium. Hydrogen peroxide of higher concentration is effective but at the present time it is relatively more expensive than the lower concentration products. Hydrogen peroxide of concentrations lower than 30% is workable, but involves the undesirable factor of great dilution of the reaction mixtures.

Suitable acids for reaction with the alkali thiocyanates to form thiocyanic acid include sulfuric and phosphoric acid. Nitric acid may be used under certain conditions, but it is generally desired to avoid an acid possessing oxidizing properties when working in a medium containing reactive organic compounds such as ethyl alcohol. The halogen acids such as hydrochloric and hydrobromic acid are normally to be avoided because of their reactivity with hydrogen peroxide.

Control of the reaction temperature is important. If the temperature is permitted to rise appreciably above 50° C., the rate of polymerization of free thiocyanogen to perthiocyanic acid becomes excessive. At temperatures below 0° C. the rate of reaction of hydrogen peroxide with thiocyanic acid is too low for practical purposes. Preferred temperatures are between 10° C. and 30° C.

The following reactive organic compounds can be treated with free thiocyanogen in order to prepare thiocyanogen derivatives: aromatic amines such as aniline and its homologs, including ethyl aniline, diethyl aniline, butyl aniline, dibutyl aniline, diphenyl amine, and substituted anilines such as the chloro and nitro anilines; phenol derivatives such as the nitro phenols, chlorophenols, and ortho-cresol; hydroxyphenols such as resorcinol, catechol, pyrogallol, and phloroglucinol; unsaturated organic compounds such as butadiene, isobutylene, vinylcyclohexene, styrene monomer, dicyclopentadiene, allyl chloride, allyl alcohol, drying oils and their fatty acids, and other olefinic compounds. In the specification and claims the above listed compounds will be referred to as "thiocyanogen acceptors."

Illustrative of the processes which may be used to carry out the present reactions are the following examples, which examples are given by way of illustration but are in no sense to be considered limiting as to the scope of the present invention. In the following examples all quantities represent parts by weight.

Example I

To produce a solution of free thiocyanogen in a mixture of alcohol and water, the following reactants were added in the indicated order to a suitable vessel equipped for agitation and cooling.

| | |
|---|---|
| Water | 150 |
| Methanol | 100 |
| Sulfuric acid, concentrated | 25 |
| Sodium thiocyanate—0.3 mole | 25 |
| Hydrogen peroxide, 30%—0.27 mole | 30 |

To the solution of sodium thiocyanate in an alcohol-water solvent the sulfuric acid was gradually added with simultaneous cooling and agitation. The resultant solution of thiocyanic acid was cooled to 10° C. and the hydrogen peroxide was then gradually added. The free thiocyanic acid was obtained as a clear orange-colored solution in alcohol-water solvent. Preferably the free thiocyanic acid may be used for reaction with a thiocyanogen acceptor such as described in Example IV below. In order to minimize the polymerization of the thiocyanic acid to perthiocyanic acid, the temperature of the reaction mixture should be held at approximately 0° C. until it is used.

Example II

An aqueous solution of thiocyanic acid was mixed with ethyl ether so as to take up the thiocyanic acid in ether. The ether was separated from the aqueous phase and added to an amount of anhydrous ethanol equivalent to one-third the volume of ether solution. To the ether thiocyanic acid-ethanol solution was added a slight excess of 30% hydrogen peroxide which reacted with the thiocyanic acid in accordance with the equation above.

This solution of free thiocyanogen, without the inorganic salts or acids which are present in solutions of free thiocyanogen prepared by conventional methods, was taken for reaction with a thiocyanogen acceptor as described in Example IV below.

Example III

For the production of thiocyano-meta-toluidine, the following reactants were charged to a kettle in the order shown:

| | |
|---|---|
| Methanol | 500 |
| Sodium thiocyanate | 48.5 |
| Meta-toluidine | 26.7 |
| Sulfuric acid, conc. | 51.0 |
| Acetic acid, glacial | 50.0 |
| Hydrogen peroxide | 68.0 |
| Methanol | 74.0 |

The addition of the sulfuric acid caused the precipitation of the meta-toluidine sulfate. This formed a heavy slurry which was diluted and partially dissolved with acetic acid. Over a period of 2 to 3 hours there was added, in increments, the hydrogen peroxide which had been mixed with an equal volume of methanol. The temperature of the reaction mixture was maintained at 18–21° C. during the addition of most of the peroxide, and was finally permitted to rise to 30° C. at the end of the reaction. The color of the mixture which had remained light during the addition of most of the hydrogen peroxide, turned quite dark at the end when an excess of free thiocyanogen was present.

The reaction mixture was poured into a large volume of water made alkaline by the addition of sodium hydroxide, and the alkaline mixture was extracted once with benzene to recover the thiocyano-meta-toluidine. The benzene solution, after being treated with an adsorbent activated carbon such as "Darco," was filtered, and the benzene removed by distillation at reduced pressure to leave a residue of crude thiocyano-meta-toluidine amounting to 74% of theory. After several recrystallizations from ethanol-water mixtures a white crystalline product was obtained having a melting point range of 78–80° C.

Example IV

For the preparation of the thiocyanogen addition products of olefinic hydrocarbons and other thiocyanogen acceptors of limited solubility in polar solvents, it is desirable to carry out the reaction in an ether solution. For such cases solutions of free thiocyanogen, as prepared by Example II, are used as the source of thiocyanogen. Thus, to a solution of higher molecular weight olefin such as decene-1 dissolved in carbon tetrachloride there is slowly added a solution of free thiocyanogen in ether. After allowing sufficient time for the reaction of the thiocyanogen with the olefin, the reaction mixture is filtered for removal of any perthiocyanic which may have formed. The dithiocyanodecane is then recovered by removal of the solvent by distilling at reduced pressure.

This general technique may be applied with equal advantage to solutions of thiocyanogen acceptors in hexane, decahydronaphthalene, cyclohexane, ethylene dichloride, and similar classes of compounds in which inorganic thiocyanates are insoluble.

This application is a division of application Serial Number 20,840, filed April 13, 1948.

The preferred form of the invention having been thus described, what is claimed as new is:

1. In a process for preparing a thiocyanogen derivative of a thiocyanogen acceptor selected from the class consisting of aromatic amines, phenols and olefinic compounds the steps of bringing thiocyanic acid, hydrogen peroxide, and said thiocyanogen acceptor together in a mutual solvent at a temperature between about 0 and 50° C. and recovering the thiocyanogen derivative therefrom.

2. The process of claim 1 in which the mutual solvent comprises an alcohol.

3. The process of claim 1 in which the thiocyanic acid is formed in situ from a mineral acid and a salt of thiocyanic acid.

4. The process of claim 3 in which a mutual solvent comprises a mixture of methanol and acetic acid.

5. The process of claim 1 in which the thiocyanic acid is extracted from an aqueous solution of thiocyanic acid into a solvent component of said mutual solvent.

6. The process of claim 5 in which said solvent component is diethyl ether.

7. The process of claim 6 in which the mutual solvent also contains ethanol.

8. The process of claim 1 in which the thiocyanogen acceptor is an aromatic amine.

9. The process of claim 1 in which the thiocyanogen acceptor is a phenol.

10. The process of claim 1 in which the thiocyanogen acceptor is an olefine.

11. In a process for preparing a thiocyanogen derivative of thiocyanogen acceptors selected from the class consisting of aromatic amines, phenols, and olefins the steps of bringing together a salt of thiocyanic acid, said thiocyanogen acceptor, a mineral acid in proportion to free the thiocyanic acid from its salt and, when said thiocyanogen acceptor is an aromatic amine, in proportion to unite with the amine to form the mineral acid salt thereof, and hydrogen peroxide in a mutual solvent at a temperature between about 0 and 50° C., and recovering said thiocyanogen derivative from the reaction mixture.

12. The process of claim 11 in which the mutual solvent comprises methanol and acetic acid and the mineral acid is sulfuric acid.

13. The process of claim 11 in which the thiocyanogen acceptor is a phenol.

14. The process of claim 13 in which the mutual solvent comprises methanol and acetic acid and the mineral acid is sulfuric acid.

15. The process of claim 11 in which the thiocyanogen acceptor is an olefine.

16. The process of claim 15 in which the mutual solvent comprises methanol and acetic acid and the mineral acid is sulfuric acid.

17. The process of claim 11, in which the thiocyanogen acceptor is an aromatic amine.

18. The process of claim 17 in which the mutual solvent comprises methanol and acetic acid and the mineral acid is sulfuric acid.

HARRY F. PFANN.

References Cited in the file of this patent

UNITED STATES PATENTS

| Number | Name | Date |
|---|---|---|
| 2,212,175 | Clayton et al. | Aug. 20, 1940 |
| 2,342,448 | Bousquet | Feb. 22, 1944 |
| 2,395,453 | Bruson | Feb. 26, 1946 |
| 2,395,455 | Bruson | Feb. 26, 1946 |